Figure 1:
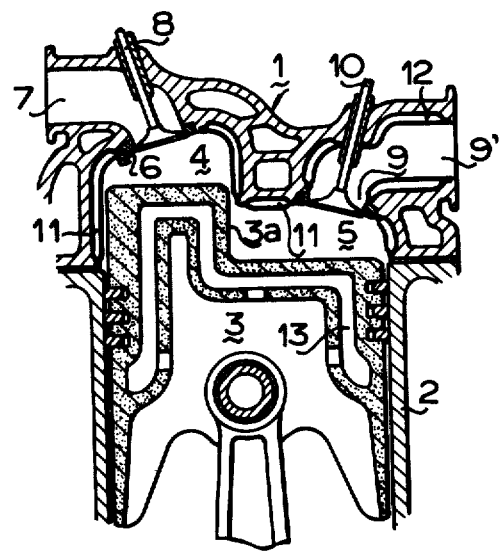

United States Patent [19]

Mizunuma et al.

[11] 4,052,972

[45] Oct. 11, 1977

[54] INTERNAL COMBUSTION ENGINE

[75] Inventors: Tokuichi Mizunuma, Hachioji; Hisamitsu Yamazoe, Oume; Isao Matsuno, Hachioji, all of Japan

[73] Assignee: Fuji Jukogyo Kabushiki Kaisha, Tokyo, Japan

[21] Appl. No.: 665,103

[22] Filed: Mar. 8, 1976

[30] Foreign Application Priority Data

Mar. 14, 1975 Japan .............................. 50-35269[U]

[51] Int. Cl.² .......................... F02B 23/00; F01B 31/08
[52] U.S. Cl. ............................... 123/191 R; 123/32 B; 123/191 A; 123/193 H; 92/144
[58] Field of Search .......................... 60/272, 282, 305; 92/144, 176, 186; 123/32 B, 37, 41.35, 191 A, 191 R, 191 SP, 191 S, 193 P, 193 CP, 193 H

[56] References Cited

U.S. PATENT DOCUMENTS

| | | | |
|---|---|---|---|
| 1,559,439 | 10/1925 | Kapraun | 123/191 A |
| 1,708,428 | 4/1929 | Moore | 123/191 L |
| 2,007,767 | 7/1935 | Moore | 123/191 L |
| 2,244,008 | 6/1941 | Hazen | 92/176 |
| 2,983,268 | 5/1961 | Heintz | 123/191 SP |
| 3,473,444 | 10/1969 | Leffers | 92/176 |
| 3,855,986 | 12/1974 | Wiss | 123/191 A |
| 3,929,107 | 12/1975 | Renger | 123/32 C |
| 3,990,234 | 11/1976 | Kajitani | 123/122 AC |

FOREIGN PATENT DOCUMENTS

| | | | |
|---|---|---|---|
| 2,323,793 | 11/1974 | Germany | 60/272 |
| 473,472 | 10/1937 | United Kingdom | 123/191 A |

*Primary Examiner*—Ronald H. Lazarus
*Assistant Examiner*—William Randolph
*Attorney, Agent, or Firm*—Martin A. Farber

[57] ABSTRACT

A heat insulation construction for gasoline engines comprising a piston, a sub-piston projecting on the top of the piston. A cylinder head is secured to the top of a cylinder and has a recess into which the sub-piston may be inserted at a position near the top dead center of the piston stroke to form two independent combustion chambers. An ignition plug is provided in one of the combustion chambers in the cylinder head. An intake passage and exhaust passage are provided in the cylinder head. A heat insulating air layer is provided in the top portion of the piston and sub-piston, and a heat insulating air layer is provided on the inner wall of the cylinder head, which is formed by casting hollow structures made of steel plates in the cylinder head.

5 Claims, 2 Drawing Figures

INTERNAL COMBUSTION ENGINE

The present invention relates to four cycle gasoline engines and more particularly to a combustion chambers for the engines.

There has been provided an internal combustion engine of the type of which a piston has projections at the top thereof and the cylinder head has recesses into which the projections may be inserted at a position near the top dead center, so that the combustion chamber may be divided into multiple combustion chambers, ignitions of divided combustion chambers progressively taking place in a predetermined order. The sequential combustion system enables the engine to be designed to permit the use of a lean mixture for the purpose of reduction of the amount of nitrogen oxides and carbon monoxide.

On the other hand, there is a great decrease of the combustion gas temperature in the combustion chamber, because of a large amount of heat removal from the combustion chamber wall of which the surface area is increased by projections on the top of the piston and recesses of the cylinder head. The decrease of the combustion gas temperature is further enhanced by increase of heat conduction from the combustion gas in the combustion chamber caused by complicated chamber construction. The drop of the combustion gas temperature results in an increase in the amount of hydrocarbon in the exhaust gas which is disadvantageous for oxidation of the hydrocarbon in the after treating apparatus such as a reactor.

Therefore, an object of the present invention is to provide an internal combustion engine which may prevent the decrease of combustion gas temperature in the combustion chamber and exhaust gas passage in the cylinder head, whereby the amount of hydrocarbon may be decreased and oxidation in the after treating apparatus may effectively take place.

Figure 2:
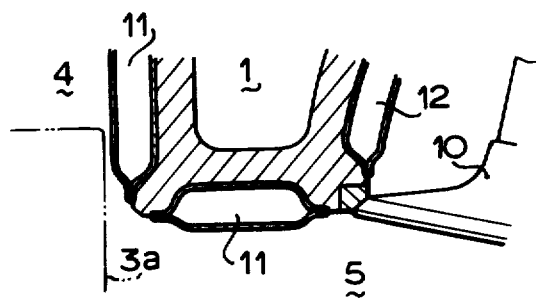

Other and further objections and advantages of the present invention will appear more fully from the following description with reference to the accompanying drawing in which:

FIG. 1 is a sectional view of a combustion chamber according to the present invention, and FIG. 2 is an enlarged illustration of a part of FIG. 1.

Referring to the drawing, a cylinder head 1 is secured on top of a cylinder 2, and a piston 3 has a top portion which is formed with a cylindrical sub-piston 3a projecting thereon. The cylinder head 1 has a recess into which the cylindrical sub-piston 3a may be inserted when the piston 3 reaches the position near the top dead center of the piston stroke. The insertion of sub-piston 3a with the recess divides the combustion chamber into the first combustion chamber 4 and the second combustion chamber 5. In the first combustion chamber, an ignition plug 6 and an intake port 7 with an intake valve 8 are provided. In the second combustion chamber 5 an exhaust port 9 is provided with an exhaust valve 10.

In accordance with the present invention, the inner walls of the first and second combustion chambers 4 and 5, exhaust port 9 and exhaust passage 9' in the cylinder head are covered with liners 11 and 12 of heat resisting and heat insulating material such as steel plate. As shown in FIG. 2, each liner is constructed by steel plates into a hollow structure to form a heat insulating air layer in which heat insulating material may be provided if necessary. The liners are preferably made by molding the steel plates in the cylinder head block at the molding thereof. Further, a heat insulating air layer 13 is formed in the piston 3 at the top portion thereof.

In operation, when the sub-piston 3a enters into the recess of the cylinder head in the compression stroke, the combustion chamber is divided into the first and second chambers as described above. The ignition plug 6 is energized near the top dead center so that gas in the first combustion chamber 4 is burned. When the first combustion chamber 4 communicates with the second combustion chamber 5 during the downward stroke, the piston flame which has grown in the first combustion injects into the second combustion chamber, whereby the gas in that chamber is burned.

This combustion system is regarded as a constant pressure combustion rather than the constant volume combustion. Therefore, the amount of nitrogen oxides may be reduced. However, as described above, an increase of the surface area of the combustion chamber and an increase of heat conduction tend to lower the combustion gas temperature. In accordance with the present invention, the liners 11 and the heat insulating air layer 13 may prevent the decrease of combustion gas temperature. Thus, the amount of hydrocarbon may be reduced. Further, since the liners 12 in the exhaust port 9 and exhaust passage 9' may prevent the decrease of exhaust gas temperature, therefore, comparatively high temperature exhaust gas is fed to the after treating device such as a reactor, whereby oxidation of the unburned constituents may effectively take place to reduce the amount of the constituents.

From the foregoing, it will be understood that the present invention, provides an internal combustion engine which may prevent the decrease of combustion gas temperature, whereby oxidation of the unburned constituents in the after treating device may be effectively performed.

What is claimed is:

1. A heat insulation construction for gasoline engines comprising
    a cylinder having a top,
    a piston reciprocably disposed in said cylinder, said piston having a top portion,
    a sub-piston projecting from said top portion of said piston,
    a cylinder head secured to the top of said cylinder having an inner wall forming a recess cooperating with said sub-piston such that the latter is inserted therein at a position near a top dead center of a piston stroke to form two independent combustion chambers,
    an ignition plug means provided in one of said combustion chambers in said cylinder head for igniting said one combustion chamber prior to communication of said two combustion chambers,
    said cylinder head having an intake passage and exhaust passage operatively communicating with said combustion chambers,
    first means for forming a heat insulating air layer provided in said top portion of said piston and said sub-piston, and
    a second means forming a heat insulating air layer adjacent to said inner wall of said cylinder head, said second means constituting a cast formed hollow structure made of steel plates cast in said cylinder head.

2. The heat insulation construction as set forth in claim 1, wherein said plates include an outermost plate and an innermost plate secured to each other along respective edges thereof and spaced from one another therebetween, said innermost plate complementarily abuts said cylinder head along the entire surface of said innermost plate.

3. The heat insulation construction, as set forth in claim 1, further comprising heat insulation material disposed in said hollow structure between said plates.

4. A heat insulation construction for gasoline engines comprising
   a cylinder having a top,
   a piston reciprocably disposed in said cylinder, said piston having a top portion,
   a sub-piston projecting from said top portion of said piston,
   a cylinder head secured to the top of said cylinder having an inner wall forming a recess cooperating with said sub-piston such that the latter is inserted therein at a position near a top dead center of a piston stroke to form two independent combustion chambers,
   an ignition plug means provided in one of said combustion chambers in said cylinder head for igniting said one combustion chamber prior to communication of said two combustion chambers,
   said cylinder head having an intake passage and exhaust passage operatively communicating with said combustion chambers,
   first means for forming a heat insulating air layer provided in said top portion of said piston and said sub-piston, and
   a second means forming a heat insulating air layer adjacent to said inner walls of said cylinder head and said exhaust passage, said second means constituting a cast formed hollow structure made of steel plates cast in said cylinder head.

5. The heat insulation construction as set forth in claim 4, wherein
   said plates include an outermost plate and an innermost plate secured to each other along respective edges thereof and spaced from one another therebetween, said innermost plate complementarily abuts said cylinder head along the entire surface of said innermost plate.

* * * * *